US010191696B2

(12) United States Patent
Okamoto et al.

(10) Patent No.: US 10,191,696 B2
(45) Date of Patent: Jan. 29, 2019

(54) IMAGE FORMING SYSTEM INCLUDING A FIRST IMAGE FORMING APPARATUS AND A SECOND IMAGE FORMING APPARATUS CONNECTED ON A DOWNSTREAM SIDE OF THE FIRST IMAGE FORMING APPARATUS

(71) Applicant: KONICA MINOLTA, INC., Chiyoda-ku, Tokyo (JP)

(72) Inventors: Akira Okamoto, Hino (JP); Katsunori Takahashi, Hachioji (JP); Takashi Nara, Kawagoe (JP); Kenji Yamamoto, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/790,166

(22) Filed: Oct. 23, 2017

(65) Prior Publication Data

US 2018/0129456 A1    May 10, 2018

(30) Foreign Application Priority Data

Nov. 9, 2016  (JP) ................................. 2016-219245

(51) Int. Cl.
 *G06F 3/12* (2006.01)
(52) U.S. Cl.
 CPC .......... *G06F 3/1215* (2013.01); *G06F 3/1241* (2013.01); *G06F 3/1243* (2013.01); *G06F 3/1244* (2013.01); *G06F 3/1281* (2013.01)

(58) Field of Classification Search
 None
 See application file for complete search history.

(56) References Cited

U.S. PATENT DOCUMENTS

2007/0211295 A1*  9/2007  Hosoi ..................... G03G 15/36
                                                          358/1.18
2012/0099151 A1*  4/2012  Kurihara ................... B41J 3/60
                                                          358/1.15

FOREIGN PATENT DOCUMENTS

JP        2012-141389 A      7/2012

* cited by examiner

*Primary Examiner* — Andrew H Lam
(74) *Attorney, Agent, or Firm* — Buchanan Ingersoll & Rooney PC

(57) ABSTRACT

An image forming system includes: a first image forming apparatus; and a second image forming apparatus connected on a downstream side of the first image forming apparatus in a paper conveying direction, wherein the first image forming apparatus includes: a first expander that expands a first image having image expansion time per page including first time; and a first image former that forms the first image expanded by the first expander, onto a first face of paper, and the second image forming apparatus includes: a second expander that expands a second image having image expansion time per page including second time longer than the first time; and a second image former that forms the second image expanded by the second expander, onto the first face on which the first image has been formed.

15 Claims, 4 Drawing Sheets

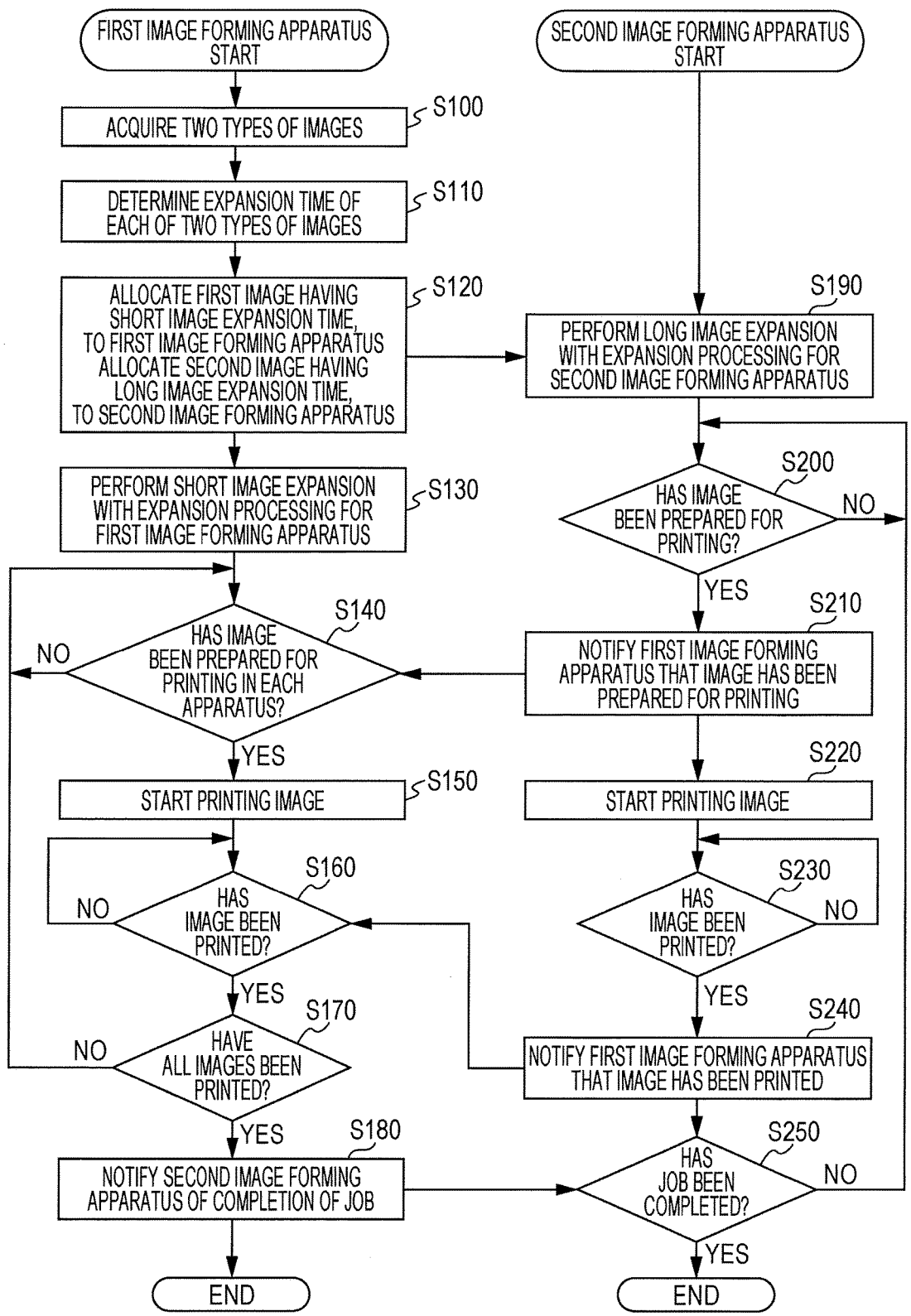

IMAGE FORMING SYSTEM INCLUDING A FIRST IMAGE FORMING APPARATUS AND A SECOND IMAGE FORMING APPARATUS CONNECTED ON A DOWNSTREAM SIDE OF THE FIRST IMAGE FORMING APPARATUS

Japanese Patent Application No. 2016-219245 filed on Nov. 9, 2016, including description, claims, drawings, and abstract the entire disclosure is incorporated herein by reference in its entirety.

BACKGROUND

Technological Field

The present invention relates to an image forming system.

Description of the Related Art

Conventionally, an image forming system including a plurality of image forming apparatuses (e.g., two image forming apparatuses) tandem-connected in series, has been known. In the image forming system, one image forming apparatus forms a predetermined image on one face of paper and the other image forming apparatus forms a predetermined image on the other face of the paper so that high-speed printing processing is achieved.

JP 2012-141389 A describes an image forming system in which a first image forming apparatus and a second image forming apparatus each form a predetermined image on a region on the same face of paper, the two image forming apparatuses being coupled in series in the image forming system. With this arrangement, for example, in a case where printing is performed in a 2-in-1 format, the two image forming apparatuses form the images, being allocated to two regions on the same face of paper, and thus the acceleration of processing time can be achieved.

Here, in a case where a large number of images each including the same basic image and a different name and address, are printed as in typical direct mail, the size of a file may be small for only the names and the addresses, but the size of a file may increase depending on the basic image illustrating, for example, a commodity.

However, in a case where, for example, two images are allocated to two image forming apparatuses so that printing jobs are performed, without consideration of the sizes of image files, as in the conventional image forming systems described above, the following problems occur. For example, in a case where an image file having data large in size is allocated to the image forming apparatus on the upstream side, a problem occurs that performing expansion processing of the image requires time and conveying control of paper becomes intricate. With the problem, another problem occurs that the productivity in the printing degrades.

SUMMARY

Therefore, the present invention has been made in consideration of the above problems, and an object of the present invention is to provide an image forming system capable of improving productivity in printing.

To achieve the abovementioned object, according to an aspect of the present invention, an image forming system reflecting one aspect of the present invention comprises: a first image forming apparatus; and a second image forming apparatus connected on a downstream side of the first image forming apparatus in a paper conveying direction, wherein the first image forming apparatus includes: a first expander that expands a first image having image expansion time per page including first time; and a first image former that forms the first image expanded by the first expander, onto a first face of paper, and the second image forming apparatus includes: a second expander that expands a second image having image expansion time per page including second time longer than the first time; and a second image former that forms the second image expanded by the second expander, onto the first face on which the first image has been formed.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a flowchart of an exemplary operation of the image forming system in image forming.

DETAILED DESCRIPTION OF EMBODIMENTS

Hereinafter, preferred embodiments of the present invention will be described in detail with reference to the drawings. However, the scope of the invention is not limited to the disclosed embodiments. Note that the ratios of the drawings in dimensions have been expanded for convenience of the descriptions, and may be different from the actual ratios.

A preferred embodiment of the present invention will be described in detail below with reference to the attached drawings. Note that the ratios of the drawings in dimensions have been expanded for convenience of the descriptions, and may be different from the actual ratios.

[Exemplary Configuration of Image Forming System 100]

Figure 1:
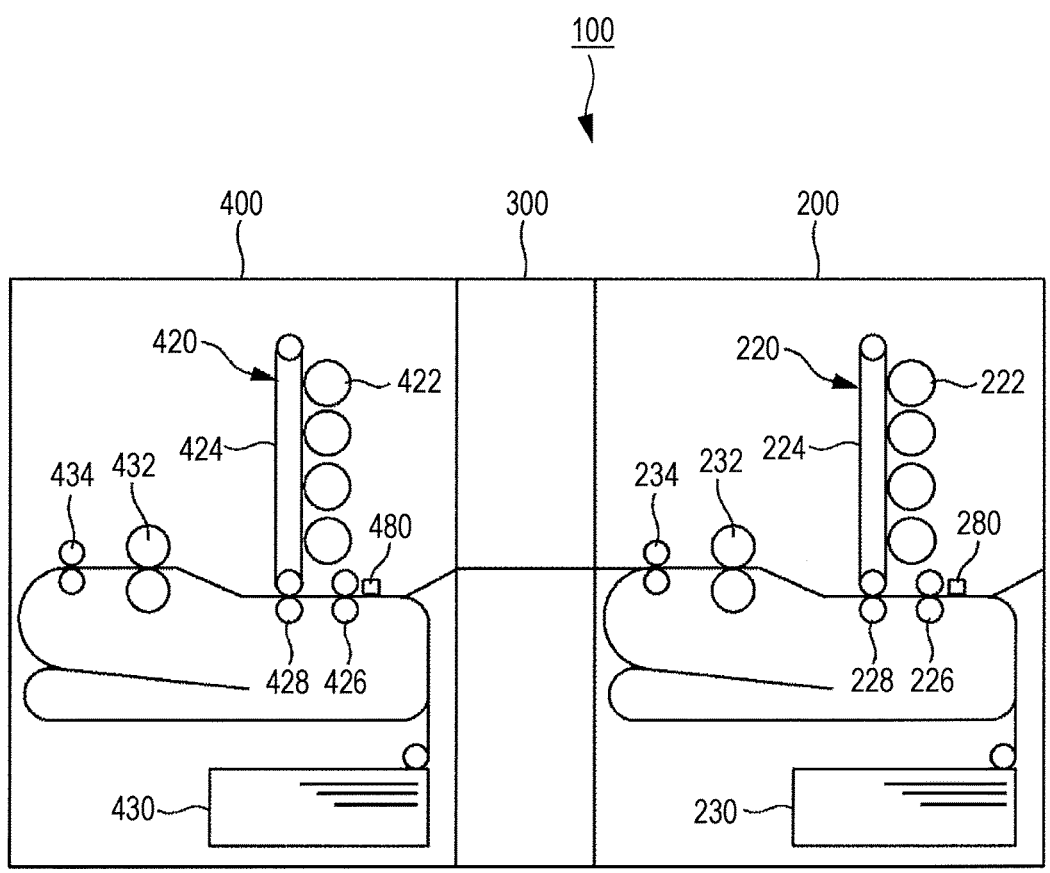
FIG. 1 is a diagram of an exemplary configuration of an image forming system according to one embodiment of the present invention.

FIG. 1 illustrates an exemplary schematic configuration of an image forming system 100 according to the embodiment of the present invention. As illustrated in FIG. 1, the image forming system 100 includes a first image forming apparatus 200, a paper conveying apparatus 300, and a second image forming apparatus 400.

The first image forming apparatus 200 and the second image forming apparatus 400 each have substantially the same configuration and function, and are coupled to each other through the paper conveying apparatus 300. The first image forming apparatus 200 prints, for example, an image file on paper P, the image file including image data small in size, the image data being different per page (hereinafter, referred to as a first image). Note that the first image includes the data small in size so that image expansion processing time per page is short (first time). The second image forming apparatus 400 prints an image file on the same face of the paper P on which the first image forming apparatus 200 has printed the image, the image file including image data large in size, the image data having one page (hereinafter, referred to as a second image). Note that the second image includes the data large in size so that image expansion processing time per page is long (second time).

Note that the first image forming apparatus 200 and the second image forming apparatus 400 do not necessarily have the paper conveying apparatus 300 provided therebetween, and thus can be directly coupled to each other. A front-and-back inversion mechanism of the paper P is provided to the paper conveying apparatus 300 so that the first image forming apparatus 200 can print a predetermined image on the front side of the paper P and the second image forming apparatus 400 can print a predetermined image on the back side of the paper P. For convenience, the detailed description of the paper conveying apparatus 300 will be omitted below.

(First Image Forming Apparatus 200)

Next, the first image forming apparatus 200 will be described with reference to FIG. 1. As illustrated in FIG. 1, the first image forming apparatus 200 includes a paper feeder 230, an image former 220 corresponding to an exemplary first image former, and a fixer 232.

The paper feeder 230 houses the paper P having, for example, an A4 size or an A3 size. The paper feeder 230 includes a paper feeding cassette detachably attachable to the device body. A registration roller 226 is provided between the paper feeder 230 and a secondary transfer roller 228. The registration roller 226 strikes the head of each sheet of the paper P fed from the paper feeder 230 and forms a loop so that the curvature of the paper P is corrected and additionally the paper P is conveyed to the secondary transfer roller 228 with predetermined timing.

A registration sensor 280 is provided on the upstream side of the registration roller 226 in a paper conveying direction. The registration sensor 280 includes, for example, an optical sensor including a light emitter and a light receiver, and detects the head of the paper P conveyed from the paper feeder 230 in order to calculate the conveying timing of the paper P.

Figure 2:
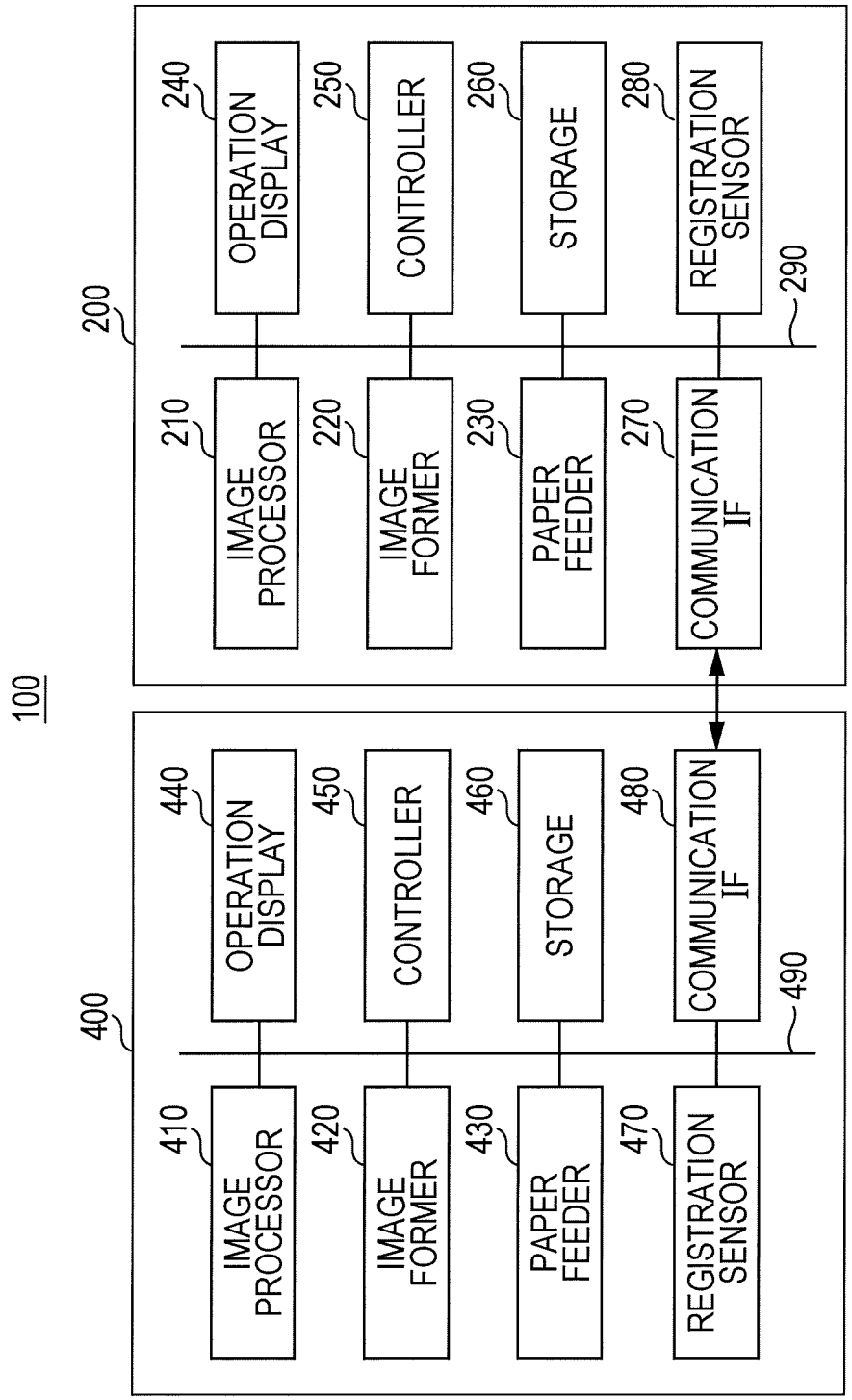
FIG. 2 is a block diagram of an exemplary functional configuration of the image forming system.

The image former 220 uses an electrophotography process to print the image onto the paper P on the basis of printing data stored in a storage (refer to FIG. 2). The image former 220 includes imaging units 222, an intermediate transfer belt 224, and the secondary transfer roller 228.

The imaging units 222 are individually provided to correspond to yellow (Y), magenta (M), cyan (C), and black (K) in color, and each includes a photoconductor drum, a charger, an exposure device, and a developer. The charger uniformly charges the surface of the photoconductor drum. The exposure device forms an electrostatic latent image corresponding to the image data, on the surface of the photoconductor drum that has been uniformly charged. The developer develops the electrostatic latent image into a toner image.

The intermediate transfer belt 224 includes an endless belt, and is wound by a plurality of rollers and is supported so as to be drivable. The respective toner images formed on the surfaces of the photoconductor drums, are successively transferred onto the intermediate transfer belt 224, and a toner image (a color image) including the respective layers of (Y), (M), (C), and (K) in color, superimposed, is formed on the intermediate transfer belt 224.

The secondary transfer roller 228 transfers the toner image formed on the intermediate transfer belt 224, to the paper P. Note that a high-voltage positive voltage is applied to the secondary transfer roller 248 in transferring the toner image so that the toner image that has been negatively charged, is electrostatically attracted to the paper P.

The fixer 232 includes a fixing roller including a heater built in and a pressure roller. In passing through a nipper between the fixing roller and the pressure roller, the toner image transferred to the paper P, is added with pressure and heat so as to be fusion-fixed on the surface of the paper P.

A delivery roller 234 conveys the paper P to which the fixer 232 has performed the fixing processing, to the second image forming apparatus 400 through the paper conveying apparatus 300.

(Second Image Forming Apparatus 400)

Next, the second image forming apparatus 400 will be described with reference to FIG. 1. As illustrated in FIG. 1, the second image forming apparatus 400 includes a paper feeder 430, a registration sensor 480, an image former 420 corresponding to an exemplary second image former, and a fixer 432.

The image former 420 forms an image onto the surface of the paper P conveyed from the first image forming apparatus 200. That is, the second image is formed on the same face of the paper P on which the first image forming apparatus 200 has formed the first image. Note that the second image forming apparatus 400 has substantially the same configuration and function as the first image forming apparatus 200 described above, and thus the detailed description will be omitted.

[Exemplary Block Configuration of Image Forming System 100]

FIG. 2 is a block diagram of an exemplary functional configuration of the image forming system 100 according to the embodiment of the present invention. Note that, the description of the paper conveying apparatus 300 will be omitted below for convenience. As illustrated in FIG. 2, the image forming system 100 includes the first image forming apparatus 200 and the second image forming apparatus 400.

(First Image Forming Apparatus 200)

The first image forming apparatus 200 includes a controller 250 that controls the operation of the entire apparatus. The controller 250 includes a control circuit including, for example, a microprocessor that performs the control of each part and various types of arithmetic processing on the basis of programs stored in, for example, a ROM. The controller 250 performs image forming processing of printing the predetermined image onto the paper P.

An image processor 210 corresponding to an exemplary first expander, the image former 220, the paper feeder 230, an operation display 240, a storage 260, a communication IF 270, and the registration sensor 280 each are connected to the controller 250 through a bus 290.

The image processor 210 performs raster image processing (RIP) to the printing data so as to generate raster image data to be used by the image former 220. The image processor 210 performs expansion processing to the first image having a large number of pages, the first image having the addresses and the names small in size, onto an image memory (e.g., the storage 260), and outputs the first image data to which the expansion processing has been performed, to the image former 220. Note that the expansion processing of the first image may be performed with separately provision of an image expander or with an arithmetic device, such as the controller 250.

The image former 220 uses the electrophotography process to print the predetermined image onto the paper P on the basis of an instruction from the controller 250. The registration roller 226 of the image former 220 adjusts the conveyance of the paper P in response to the image expansion state of the second image in the second image forming apparatus 400. Specifically, in a case where determining that image expansion processing of the second image has delayed in the second image forming apparatus 400, the controller 250 stops the rotation of the registration roller 226 so as to stop the conveyance of the paper P, and restores the rotation of the registration roller 226 in response to the expansion state of the second image so as to reconvey the paper P.

On the basis of an instruction from the controller 250, the paper feeder 230 extracts the paper P having a predetermined size so as to feed the paper P to the image former 220. In a case where determining that the image expansion processing of the second image in the second image forming apparatus 400 has delayed, the controller 250 performs paper feeding control of delaying the extracting timing of the paper P from the paper feeder 230.

The operation display 240 acts as a display and an input, and thus displays a device configuration, the progress state of a printing job, the occurrence state of an error, or a current changeable setting, or receives an instruction with a position touched by a finger or a stylus pen. The operation display 240 may be provided with a plurality of keys including, for example, a selection key for specifying a paper size, a numeric keypad for setting the number of copies, and a start key for instructing the start of an operation.

The storage 260 stores various programs and various types of data, and includes a read only memory (ROM), a random access memory (RAM), a rewritable nonvolatile semiconductor memory (e.g., a flash memory), or a hard disk drive. The programs include, for example, an image forming program.

The communication IF 270 performs transmission and reception of data relating to the image forming processing, with the second image forming apparatus 400 through the paper conveying apparatus 300 not illustrated. The communication IF 270 includes, for example, an expansion device including a LAN board, and performs transmission and reception of data, such as a printing job, with a computer through a network.

The registration sensor 280 includes, for example, the optical sensor including the light emitter and the light receiver, and is provided on the upstream side of the registration roller 226 in the paper conveying direction. The registration sensor 280 detects, for example, the head of the paper P conveyed from the paper feeder 230 so as to supply a detected signal to the controller 250.

(Second Image Forming Apparatus 400)

The second image forming apparatus 400 includes a controller 450 that controls the operation of the entire apparatus. The controller 450 includes a control circuit including, for example, a microprocessor that performs the control of each part and various types of arithmetic processing on the basis of programs stored in, for example, a ROM. The controller 450 performs image forming processing to print the predetermined image onto the paper P.

An image processor 410 corresponding to an exemplary second expander, the image former 420, the paper feeder 430, an operation display 440, a storage 460, a communication IF 470, and the registration sensor 480 each are connected to the controller 450 through a bus 490. Note that the detailed descriptions of the constituent elements in common with the first image forming apparatus 200, will be omitted.

The image processor 410 performs expansion processing to the second image having one page, the second image including an image illustrating a commodity (a background image), large in size, onto an image memory (e.g., the storage 460), and outputs the second image data to which the expansion processing has been performed, to the image former 420. Note that the expansion processing of the second image may be performed with separately provision of an image expander or with an arithmetic device, such as the controller 450.

[Printed Matter]

Figure 3A:
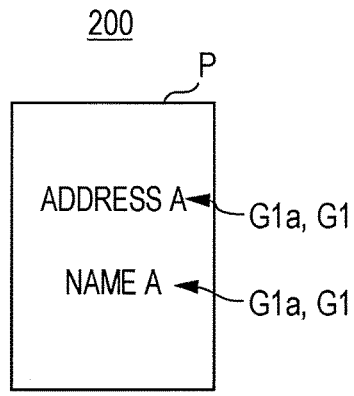
FIGS. 3A to 3C are diagrams for describing a first image and a second image printed on paper (part 1)
Figure 3B:
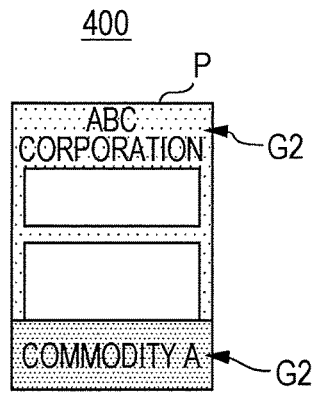
Figure 3C:
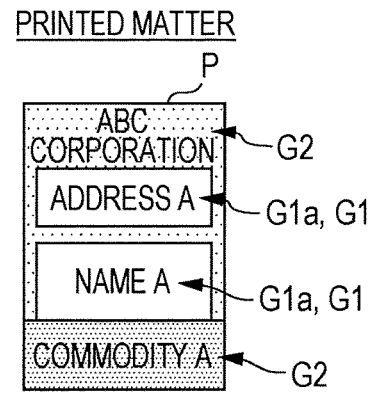

FIG. 3A illustrates the first image G1*a* printed on the surface of a first sheet of the paper P by the first image forming apparatus 200. FIG. 3B illustrates the second image G2 printed on the surface of the first sheet of the paper P by the second image forming apparatus 400. FIG. 3C illustrates printed matter finally printed on the first sheet of the paper P by the first image forming apparatus 200 and the second image forming apparatus 400. Note that the commodity A is represented with characters for convenience in FIGS. 3B and 3C, but an object indicating the commodity A is displayed in practice.

A text image including the addresses A, B, and the like, and the names A, B, and the like (the first image G1) is allocated to the first image forming apparatus 200, the text image having a large number of pages, the text image being small in size. As illustrated in FIG. 3A, the first image forming apparatus 200 image-expands the first image G1*a* corresponding to the first sheet, that has been transmitted, and prints the first image G1*a* including the address A and the name A at a substantially center on the surface of the first sheet of the paper P. In this case, the image file including the address A and the name A, is small in size so that the expansion processing time can be short. The paper P on which the first image forming apparatus 200 has printed the address A and the name A, is conveyed to the second image forming apparatus 400.

The image file indicating the commodity, the image file having one page and being large in size (the second image G2), is allocated and transmitted to the second image forming apparatus 400. As illustrated in FIG. 3B, the second image forming apparatus 400 image-expands the second image G2 that has been transmitted, and prints the second image G2 illustrating a corporate name and the commodity A, onto the surface of the first sheet of the paper P conveyed from the first image forming apparatus 200. That is, the second image G2 illustrating the commodity A is printed on the same face of the paper P on which the first image forming apparatus 200 has printed the first image G1*a* including the address A and the name A. In this case, the image file indicating the commodity A is large in size so that the expansion processing time is longer than that of the text image.

In this manner, as illustrated in FIG. 3C, provided is the printed matter including the address A, the name A, and the commodity A printed on the same face of the surface of the first sheet of the paper P.

Figure 4A:
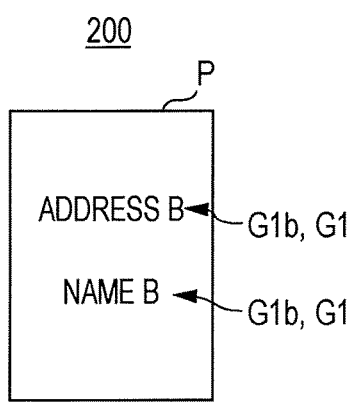
FIGS. 4A to 4C are diagrams for describing the first image and the second image printed on paper (part 2)
Figure 4B:
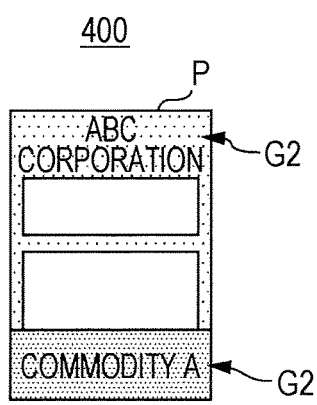
Figure 4C:
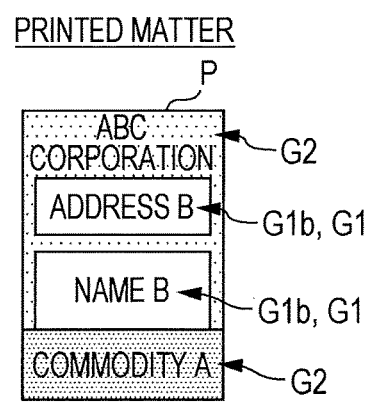

FIG. 4A illustrates the first image G1*b* printed on the surface of a second sheet of the paper P by the first image forming apparatus 200. FIG. 4B illustrates the second image G2 printed on the surface of the second sheet of the paper P by the second image forming apparatus 400. FIG. 4C illustrates printed matter finally printed on the second sheet of the paper P by the first image forming apparatus 200 and the second image forming apparatus 400. Note that the commodity A is represented with the characters for convenience in FIGS. 4B and 4C, but the object illustrating the commodity A is displayed in practice.

As illustrated in FIG. 4A, the first image forming apparatus 200 image-expands the first image G1*b* corresponding to the second sheet, that has been transmitted, and prints the first image G1*b* including the address B and the name B, at a substantially center on the surface of the second sheet of the paper P. In this case, the image file including the address B and the name B, is small in size so that the expansion processing time can be short. The paper P on which the first image forming apparatus 200 has printed the address B and the name B, is conveyed to the second image forming apparatus 400.

As illustrated in FIG. 4B, the second image forming apparatus 400 prints the second image G2 illustrating the commodity A, onto the surface of the second sheet of the paper P conveyed from the first image forming apparatus 200. In this case, the image file to which the expansion processing has been performed in the printing onto the first sheet of the paper P, can be used for the second image G2 illustrating the commodity A. Therefore, in the printing onto the second sheet, the expansion processing time of the second image G2 being the image file, shortens.

In this manner, as illustrated in FIG. 4C, provided is the printed matter including the address B, the name B, and the commodity A printed on the same face of the surface of the second sheet of the paper P. According to the present embodiment, such printing processing is repeatedly performed to a third sheet and the subsequent sheets.

[Exemplary Operation of Image Forming System 100]

FIG. 5 is a flowchart illustrating an exemplary operation of the image forming system 100 in a case where the two types of images are allocated to the first image forming apparatus 200 and the second image forming apparatus 400 so as to be printed. The controller 250 of the first image forming apparatus 200 and the controller 450 of the second image forming apparatus 400 execute the programs and job data read from the storage 260 and the like so as to achieve the image forming processing illustrated in the flowchart of FIG. 5.

As illustrated in FIG. 5, at step S100, the first image forming apparatus 200 acquires the two types of image data including the first image G1 and the second image G2 transmitted from the computer through the network. Note that the first image G1 and the second image G2 may be transmitted to the side of the second image forming apparatus 400. After step S100 is completed, the processing proceeds to step S110.

At step S110, the first image forming apparatus 200 determines (calculates) the image expansion processing time of each of the first image G1 and the second image G2 that have been acquired. According to the present embodiment, since the first image G1 is small in size per page, it is determined that the image expansion processing time is short. Since the second image G2 is large in size per page, it is determined that the image expansion processing time is long. After step S110 is completed, the processing proceeds to step S120.

At step S120, the first image forming apparatus 200 allocates the first image G1 having the image expansion processing time shorter, to the first image forming apparatus 200 itself on the basis of a result of the determinations. Meanwhile, the first image forming apparatus 200 allocates the second image G2 having the image expansion processing time longer, to the second image forming apparatus 400 so as to transmit the second image G2 to the second image forming apparatus 400 through the communication IF 270. Note that the image expansion time of each image may be determined on the side of the computer, and then the images may be transmitted to the corresponding first and second image forming apparatuses 200 and 400 on the basis of a result of the determinations. After step S120 is completed, the processing proceeds to step S130.

At step S130, the first image forming apparatus 200 performs image expansion processing to the first image G1 allocated to itself. Specifically, the image processor 210 performs the image expansion processing to the text image data of the addresses and the names included in the first image G1. After step S130 is completed, the processing proceeds to step S140.

When receiving the second image G2 from the first image forming apparatus 200, the second image forming apparatus 400 performs image expansion processing to the second image G2 at step S190. Specifically, the image processor 410 performs the image expansion processing to the basic image data indicating the commodity included in the second image G2. After step S190 is completed, the processing proceeds to step S200.

At step S200, the second image forming apparatus 400 determines whether the second image G2 has been prepared for the printing onto the paper P. In a case where determining that the second image G2 has not been prepared for the printing, the second image forming apparatus 400 continues to perform the image expansion processing until the second image G2 is prepared for the printing.

Meanwhile, in a case where the second image forming apparatus 400 determines that the second image G2 has been prepared for the printing, the processing proceeds to step S210. Then, the second image forming apparatus 400 transmits information indicating that the second image G2 has been prepared for the printing, to the first image forming apparatus 200 through the communication IF 470.

At step S140, the first image forming apparatus 200 determines whether the first image G1 performed with the image expansion processing has been prepared for the printing and the information indicating that the second image G2 has been prepared for the printing, has been received from the second image forming apparatus 400.

In a case where determining that the image has not been prepared for the printing in each apparatus, the first image forming apparatus 200 remains on standby until the image is prepared for the printing in each apparatus. In contrast to this, in a case where it is determined that the image has been prepared for the printing in each apparatus, the processing proceeds to step S150.

At step S150, the first image forming apparatus 200 starts the printing processing of printing the first image G1 performed with the image expansion processing, onto the surface of the paper P. For example, as illustrated in FIG. 3A, the address A and the name A are printed on the surface of the paper P. The paper P on which, for example, the address has been printed, is conveyed to the second image forming apparatus 400 through the paper conveying apparatus 300.

With this conveyance, at step S220, the second image forming apparatus 400 starts the printing processing of printing the second image G2 performed with the image expansion processing, onto the same face of the paper P on which the first image forming apparatus 200 has printed the first image G1. For example, as illustrated in FIG. 3B, the second image G2 illustrating the commodity A is printed on the surface of the paper P so as to be superimposed on the address B and the name B.

At step S230, the second image forming apparatus 400 determined whether the second image G2 has been printed on the surface of the paper P. In a case where determining that the second image G2 has not been printed onto the paper P, the second image forming apparatus 400 continues to perform the printing processing. Meanwhile, in a case where the second image forming apparatus 400 determines that the second image G2 has been printed, the processing proceeds to step S240. The second image forming apparatus 400 transmits information on the effect that the second image G2 has been printed, to the first image forming apparatus 200.

With this transmission, at step S160, the first image forming apparatus 200 determines whether the first image G1 has been printed in the first image forming apparatus 200 and the information on the effect that the second image G2 has been printed, has been received from the second image forming apparatus 400. In a case where the first image forming apparatus 200 determines that the printing has not been completed in each apparatus, the apparatuses continue to perform the printing processing of the first image G1 and the printing processing of the second image G2. Meanwhile, in a case where the first image forming apparatus 200 determines that the printing has been completed in each apparatus, the processing proceeds to step S170.

At step S170, the first image forming apparatus 200 determines that the entire printing has been completed in the job. In a case where the first image forming apparatus 200 determines that the entire printing has not been completed in the job, the processing goes back to step S140. Then, the first image forming apparatus 200 continues to perform the remains of the job.

In a case where the first image forming apparatus 200 determines that the entire printing has been completed in the job, the processing proceeds to step S180. The second image forming apparatus 400 is notified of information indicating the completion of the job in the first image forming apparatus 200. With this arrangement, the first image forming apparatus 200 completes the set of printing processing.

When receiving the information indicating the completion of the job from the first image forming apparatus 200, at step S250, the second image forming apparatus 400 determines whether the entire printing in the job has been completed in the second image forming apparatus 400.

In a case where the second image forming apparatus 400 determines that the entire printing in the job has not been completed, the processing goes back to step S200. Then, the second image forming apparatus 400 continues to perform the printing for the remaining sheets. Meanwhile, in a case where it is determined that the entire printing in the job has been completed, the set of printing processing is completed.

As described above, according to the present embodiment, the first image forming apparatus 200 prints the first image G1 having the image expansion time short and the second image forming apparatus 400 prints the second image G2 having the image expansion time long. Thus, the time during which the paper P is conveyed from the first image forming apparatus 200 to the second image forming apparatus 400, can be allocated to the image expansion time in the second image forming apparatus 400. With this arrangement, the entire printing in the image forming system 100 can be prevented from being delayed. As a result, improvement in productivity can be achieved. Allocating the image data having the image expansion time long, to the side of the second image forming apparatus 400, can simplify the control of the conveying timing of the paper P.

In a case where the image expansion processing of the second image G2 has delayed in the second image forming apparatus 400, the registration roller 226 temporarily stops the conveyance of the paper P or delays the paper feeding timing of the paper P. Thus, the printing can be performed with high precision with, for example, a jam of the paper P being inhibited from occurring.

Note that the present invention has been described with the embodiment, but the technical scope of the present invention is not limited to the scope described in the embodiment described above. Various alterations or improvements may be added to the embodiment described above without departing from the scope of the spirit of the present invention.

For example, in a case where the number of copies in the job is a predetermined number or less, the first image G1 and the second image G2 both may be printed on the same face of the paper P in the individual first image forming apparatus 200 or second image forming apparatus 400. This is because, in this case, the entirety of the number of copies is small and the influence of a delay due to the image expansion time, is small.

In a case where the number of copies is the predetermined number or more for the first image forming apparatus 200 and the second image forming apparatus 400, the first image forming apparatus 200 may print the second image G2 and the second image forming apparatus 400 may print the first image G1. With this arrangement, successively printing the same image in large quantity on the side of one of the first image forming apparatus 200 and the second image forming apparatus 400, can be avoided so that influence can be prevented from being exerted on, for example, the photoconductor drum. As a result, for example, an image abnormality can be inhibited from occurring.

The first image forming apparatus 200 and the second image forming apparatus 400 illustrated in FIG. 1, form color images, but the present invention is not limited to image forming apparatuses each that form a color image, and thus can be applied to image forming apparatuses each that form a black-and-white image.

Furthermore, the processing described with the flowchart and the sequence diagram in the present specification, is not necessarily performed in the illustrated order. A number of the processing steps may be performed in parallel. An additional processing step may be adopted, or part of the processing steps may be omitted.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming system comprising: a first image forming apparatus; and a second image forming apparatus connected on a downstream side of the first image forming apparatus in a paper conveying direction,
   wherein the first image forming apparatus includes:
   a first expander that expands a first image having image expansion time per page including a first time; and
   a first image former that forms the first image expanded by the first expander, onto a first face of paper, and
   the second image forming apparatus includes:
   a second expander that expands a second image having image expansion time per page including a second time longer than the first time; and
   a second image former that forms the second image expanded by the second expander, onto the first face on which the first image has been formed.

2. The image forming system according to claim 1, wherein the first image including image data different per page.

3. The image forming system according to claim 1, wherein the first image forming apparatus further includes: a paper feeder that houses the paper; and a controller that adjusts paper feeding timing of the paper fed from the paper feeder in response to an expansion state of the second image in the second image forming apparatus.

4. The image forming system according to claim 1, wherein the first image forming apparatus further includes: a registration roller that corrects curvature of the paper; and a controller that stops the paper with the registration roller in response to an expansion state of the second image in the second image forming apparatus.

5. The image forming system according to claim 1, wherein either the first image forming apparatus or the second image forming apparatus prints both of the first image and the second image on the first face of the paper in a case where the number of copies is a predetermined number or less.

6. The image forming system according to claim 1, wherein the first image forming apparatus prints the second image and the second image forming apparatus prints the first image in a case where the number of copies is a predetermined number or more for the first image forming apparatus and the second image forming apparatus.

7. The image forming system according to claim 1, further comprising a hardware processor configured to:
   calculate the image expansion processing time of each of the first image and the second image; and
   allocate the image having a shorter image expansion processing time to the first image forming apparatus and allocate the image having a longer image expansion processing time to the second image forming apparatus.

8. The image forming system according to claim 7, wherein the hardware processor is in the first image forming apparatus.

9. An image forming method in an image forming system including a first image forming apparatus and a second image forming apparatus connected on a downstream side of the first image forming apparatus in a paper conveying direction, the image forming method comprising:
   expanding a first image having image expansion time per page including first time and
   forming the first image expanded by the expanding, onto a first face of paper, in the first image forming apparatus; and
   expanding a second image having image expansion time per page including second time longer than the first time and
   forming the second image expanded by the expanding, onto the first face on which the first image has been formed, in the second image forming apparatus.

10. The image forming method according to claim 9, wherein the first image includes image data different per page.

11. The image forming method according to claim 9, further comprising:
    adjusting paper feeding timing of the paper fed from a paper feeder included in the first image forming apparatus in response to an expansion state of the second image in the second image forming apparatus, the paper feeder housing the paper.

12. The image forming method according to claim 9, further comprising:
    stopping the paper with a registration roller included in the first image forming apparatus in response to an expansion state of the second image in the second image forming apparatus, the registration roller correcting curvature of the paper.

13. The image forming method according to claim 9, further comprising:
    printing both of the first image and the second image onto the first face of the paper by either the first image forming apparatus or the second image forming apparatus in a case where the number of copies is a predetermined number or less.

14. The image forming method according to claim 9, further comprising:
    printing the second image in the first image forming apparatus and printing the first image in the second image forming apparatus in a case where the number of copies is a predetermined number or more for the first image forming apparatus and the second image forming apparatus.

15. The image forming method according to claim 9, further comprising:
    calculating the image expansion processing time of each of the first image and the second image; and
    allocating the image having a shorter image expansion processing time to the first image forming apparatus and allocating the image having a longer image expansion processing time to the second image forming apparatus.

* * * * *